UNITED STATES PATENT OFFICE 1,974,626

TREATMENT OF CRACKLINGS

Roy C. Newton, Oscar T. Bloom, and Levi S. Paddock, Chicago, Ill., assignors to Industrial Patents Corporation, Chicago, Ill., a corporation of Delaware No Drawing. Application December 22, 1933, Serial No. 703,552

5 Claims. (Cl. 99—11)

This application is a continuation in part of our application entitled Treatment of cracklings, Serial No. 660,458, filed March 13, 1933.

This invention relates to the treatment of cracklings. One of the objects of this invention is to remove objectionable flavors from cracklings.

Another object of the invention is to stabilize cracklings.

Other objects will be apparent from the description and claims which follow.

In the production of animal fats and oils by rendering from fatty animal tissue, the dehydrated protein residue of the connective tissue, muscle fibres and the like, remains as a by-product. This by-product or crackling material is a wholesome food product which, although ordinarily not used directly as a food, is incorporated in other food products such as sausage and bread to increase the protein content and produce a firm bodied product.

Cracklings possess a pronounced characteristic flavor which does not always blend well with the flavor of other materials. This peculiarity necessarily limits the quantity of cracklings which may be used in other food products.

It is a particular object of this invention to provide a process which removes the peculiar flavor and thus renders cracklings more valuable as an ingredient of sausage and other food items and thus indirectly produces an improved finished product.

It is another particular object of this invention to provide a process for stabilizing and greatly increasing the keeping qualities of cracklings, enabling them to be stored for comparatively long periods of time without deterioration.

In the ordinary rendering process, the fat is heated in kettles or other equipment under pressure or vacuum, or at atmospheric pressure, depending upon the type of equipment and the method used, until the cells are completely broken down, after which the oils or fats are separated by the application of pressure.

The rendered residue is strained or pressed until all available fat has been removed. The remaining cracklings, however, normally contain about eight to twelve per cent of fat.

In carrying out the present invention the crackling are ground or pulverized to a granulated or powdered condition, and in accordance with the preferred process are then placed in suitable equipment for blowing with steam. The temperature is raised to approximately 220° F. and the mass blown with steam, either with or without agitation. The agitation hastens the desired action and may be secured either by mechanical means or from the force of the steam.

The blowing is continued for a period of from two to five hours until the flavor of the cracklings has been rendered sufficiently neutral for the purposes desired.

It will be understood that other gases may be used in the process for carrying out the objectionable volatile odors of the cracklings. In so far as the present process is one of distillation of the odors, it may be accelerated if carried out under vacuum.

In so far as the present invention is concerned with the stabilizing of the cracklings by the effect of heat on the proteins, the presence or the absence of a gas is of no significance.

It will be seen, therefore, that the present invention involves a double aspect, combining to bring about a unitary result, namely, a crackling substantially neutral in flavor, produced from rendered fatty animal tissue.

We claim:

1. The method of increasing the stability of cracklings which consists in raising the cracklings to a temperature of approximately 220° Fahrenheit and blowing steam through the mass for a substantial period of time.

2. The method of increasing the stability of cracklings which consists in raising the cracklings to a temperature of approximately 220° Fahrenheit and blowing a heated inert gas through the mass.

3. The method of increasing the stability of cracklings which consists in heating cracklings and while heated blowing steam through the mass for a substantial period of time.

4. The method of increasing the stability of cracklings which consists in simultaneously subjecting cracklings to the action of heat and a heated moving inert gas.

5. The method of treating cracklings to increase their stability which consists in raising the cracklings to a temperature of approximately 220° Fahrenheit, for a substantial period of time.

ROY C. NEWTON.
OSCAR T. BLOOM.
LEVI S. PADDOCK.